(12) United States Patent
Ohta et al.

(10) Patent No.: US 8,406,991 B2
(45) Date of Patent: Mar. 26, 2013

(54) IN-VEHICLE DEVICE AND WIRELESS COMMUNICATION SYSTEM

(75) Inventors: Satoshi Ohta, Kobe (JP); Noriaki Inoue, Kobe (JP); Toshio Kitahara, Kobe (JP); Minoru Maehata, Kobe (JP); Tomohiro Kuroko, Kobe (JP); Ikuo Yagasaki, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 582 days.

(21) Appl. No.: 12/591,498

(22) Filed: Nov. 20, 2009

(65) Prior Publication Data

US 2010/0138149 A1    Jun. 3, 2010

(30) Foreign Application Priority Data

Dec. 1, 2008 (JP) ................. 2008-306901

(51) Int. Cl.
*G01C 21/00* (2006.01)
(52) U.S. Cl. ........................................ 701/400
(58) Field of Classification Search .......... 701/400, 701/408
See application file for complete search history.

(56) References Cited

U.S. PATENT DOCUMENTS

| | | | | |
|---|---|---|---|---|
| 4,763,121 A * | 8/1988 | Tomoda et al. | ............... | 340/5.61 |
| 5,648,769 A * | 7/1997 | Sato et al. | .................. | 340/988 |
| 6,029,072 A * | 2/2000 | Barber | ......................... | 455/557 |
| 6,434,479 B1 * | 8/2002 | Kondou et al. | .............. | 701/516 |
| 7,236,100 B2 * | 6/2007 | Obradovich et al. | ......... | 340/905 |
| 7,343,165 B2 * | 3/2008 | Obradovich | ............... | 455/456.1 |
| 7,421,334 B2 * | 9/2008 | Dahlgren et al. | ............ | 701/117 |
| 7,475,057 B1 * | 1/2009 | Obradovich | .................. | 701/532 |
| 7,650,234 B2 * | 1/2010 | Obradovich et al. | ......... | 701/412 |
| 8,005,609 B2 * | 8/2011 | Uyeki et al. | .................. | 701/117 |

FOREIGN PATENT DOCUMENTS

| | | |
|---|---|---|
| JP | A-2001-249026 | 9/2001 |
| JP | A-2002-52986 | 2/2002 |
| JP | A-2002-98543 | 4/2002 |
| JP | A-2002-277278 | 9/2002 |
| JP | A-2002-286480 | 10/2002 |
| JP | A-2003-156340 | 5/2003 |
| JP | A-2003-244343 | 8/2003 |
| JP | A-2003-294480 | 10/2003 |
| JP | A-2005-3526 | 1/2005 |
| JP | A-2008-275544 | 11/2008 |
| JP | A-2008-278388 | 11/2008 |

* cited by examiner

*Primary Examiner* — Khoi Tran
*Assistant Examiner* — Nicholas Kiswanto
(74) *Attorney, Agent, or Firm* — Oliff & Berridge, PLC

(57) ABSTRACT

Upon detection of a portable terminal positioned at a predetermined distance allowing wireless communication with an in-vehicle device, the in-vehicle device in an in-vehicle system performs a pairing process with respect to the detected portable terminal to establish wireless communication with the detected portable terminal. Thereafter, the in-vehicle device acquires an image and sound acquired by an application being executed on the portable terminal from the portable terminal, with which wireless communication has been established. The in-vehicle device converts acquired various types of data into an outputtable format of the in-vehicle device and outputs the converted data to at least one of a display unit and a speaker.

5 Claims, 7 Drawing Sheets

(12) United States Patent

IN-VEHICLE DEVICE AND WIRELESS COMMUNICATION SYSTEM

CROSS-REFERENCE TO RELATED APPLICATIONS

This application is based upon and claims the benefit of priority of the prior Japanese Patent Application No. 2008-306901, filed on Dec. 1, 2008, the entire contents of which are incorporated herein by reference.

BACKGROUND OF THE INVENTION

1. Field of the Invention

The present invention relates to an in-vehicle device that has a display unit and performs wireless communication with a portable terminal device, and a wireless communication system.

2. Description of the Related Art

Along with diffusion of car navigation systems using a global positioning system (GPS), many vehicles come to have in-vehicle devices with a navigation function incorporated therein. To respond to user's desire for multiple functions in in-vehicle devices, in-vehicle devices have become remarkably multifunctional.

For example, in many cases, in-vehicle devices include functions such as a television receiving function, a compact disc (CD) reproduction function, a digital versatile disk (DVD) reproduction function, in addition to a navigation function. However, multifunctional in-vehicle devices incur a high cost of the devices, and high price is not preferable for users.

Meanwhile, portable terminal devices such as mobile telephones have come to have a navigation function and a music reproducing function while maintaining lower price. Portable terminal devices having a short-distance wireless communication function such as Bluetooth® have also come into popular use. Therefore, there are approaches to use functions of a portable terminal device in an in-vehicle device, by linking the portable terminal device and the in-vehicle device by the short-distance wireless communication function. With this arrangement, it becomes possible to reduce the price of in-vehicle devices.

For example, Japanese Patent Application Laid-open No. 2003-244343 discloses a technique, according to which a display screen to be displayed on a screen of a portable terminal device is transmitted to an in-vehicle device, and the display screen generated by the portable terminal device is displayed on a display of the in-vehicle device.

However, in the conventional technique disclosed in Japanese Patent Application Laid-open No. 2003-244343 or the like, a user operation of transmitting information to an in-vehicle device is required on the portable terminal device side and a user operation of displaying information sent from the portable terminal device on the display is required on the in-vehicle device side. Therefore, a certain degree of skill is required for controlling and linking the portable terminal device and the in-vehicle device, and this has caused inconveniences.

Specifically, a user who wishes to use a portable terminal device and an in-vehicle device in cooperation with each other in a vehicle needs to perform such operations that a wireless function such as Bluetooth is activated on both devices to transmit desired information to the in-vehicle device by specifying a destination by the portable terminal device and display received information on the in-vehicle device. Thus, to link both devices with each other, several operations need to be performed, and it is not easy for users who are not used to using such devices (elderly people, for example). Therefore, it is thought that linking a portable terminal device and an in-vehicle device according to conventional techniques is not convenient.

SUMMARY OF THE INVENTION

It is an object of the present invention to at least partially solve the problems in the conventional technology.

According to one aspect of the invention, an in-vehicle device has a display unit and performs wireless communication with a portable terminal device. The in-vehicle device includes: a wireless-communication establishing unit that, upon detection of a portable terminal device positioned at a predetermined distance allowing wireless communication with the in-vehicle device, establishes the wireless communication with the detected portable terminal device; a data acquiring unit that acquires data provided by the portable terminal device, from the portable terminal device with which the wireless communication has been established by the wireless-communication establishing unit; and an output controller that converts data acquired by the data acquiring unit into a format for outputting the data by the in-vehicle device, and outputs converted data to at least one of the display unit and a speaker.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an in-vehicle device and a wireless communication system according to the present invention will be explained below in detail with reference to the accompanying drawings.

Relevant terms used in the embodiments are explained first. "In-vehicle system" in the embodiments is a system in which an in-vehicle device referred to as "display audio" (hereinafter, DA) incorporated in a vehicle, and a portable terminal that receives an application and data from a server device are linked by using a short-distance wireless communication function.

The DA is an in-vehicle device having a multifunction linked with the portable terminal, by having only basic functions such as a display function, an audio reproduction function, and a communication function with the portable terminal. Therefore, the in-vehicle device according to the embodiments is an inexpensive device as compared with a recent highly accurate in-vehicle device incorporated in a vehicle, and for which popularization can be expected.

Further, the portable terminal is a highly accurate device having various functions such as a mail function, an Internet connection function (a website connection function), a music player function, and a motion picture reproduction function as well as the short-distance wireless communication function such as Bluetooth or infrared communication, and for example, is a mobile communication terminal such as a personal computer, personal digital assistant (PDA), mobile telephone, or personal handy-phone system (PHS).

Figure 1:
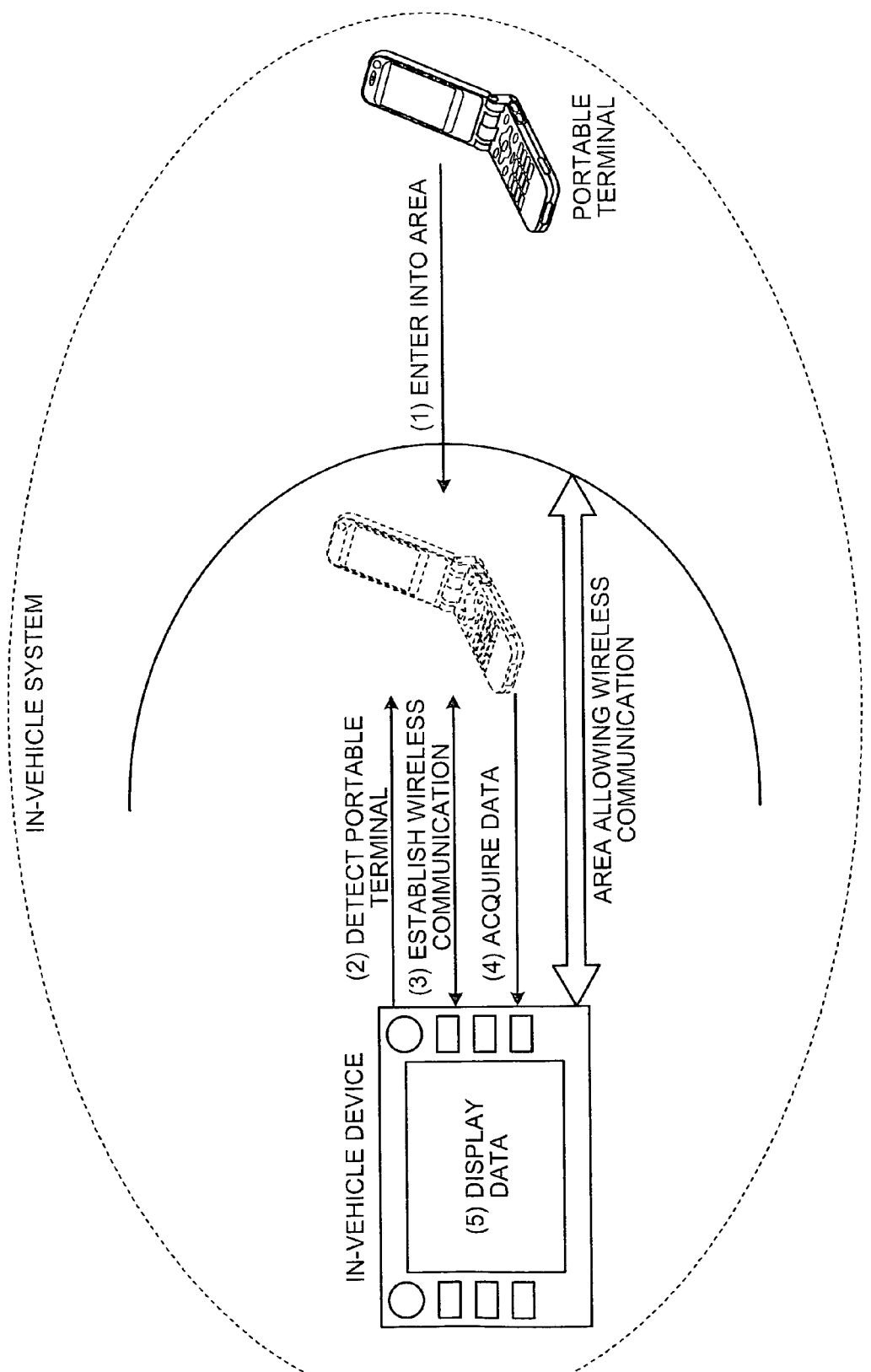
FIG. 1 is a schematic diagram for explaining an outline of an in-vehicle system according to a first embodiment of the present invention.

An outline of an in-vehicle system according to a first embodiment of the present invention is explained next with reference to FIG. 1. FIG. 1 is a schematic diagram for explaining the outline of the in-vehicle system according to the first embodiment.

As illustrated in FIG. 1, the in-vehicle system includes an in-vehicle device referred to as the DA incorporated in a vehicle and a portable terminal that receives the application and data from the server device, and can easily perform linking and controlling the portable terminal and the in-vehicle device, regardless of user's skills. In this context, linking means that information updated by a portable terminal is reflected on an in-vehicle device, and information updated by the in-vehicle device is reflected on the portable terminal. For example, when an in-vehicle device that displays an image or the like of an application being executed by a portable terminal receives an operation by a user, the operation content is executed by the portable terminal side, and the in-vehicle device outputs an operation result.

Specifically, when an engine of a vehicle is turned on and a power of the in-vehicle device is turned on accordingly, the in-vehicle device in the in-vehicle system automatically activates the short-distance wireless communication function. The in-vehicle device uses the activated short-distance wireless communication function to search for a portable terminal present at a wireless communication distance.

In this state, when detecting a portable terminal device positioned at a predetermined distance allowing wireless communication with the in-vehicle device, the in-vehicle device establishes wireless communication with the detected portable terminal device (see (1) to (3) in FIG. 1). Specifically, when the portable terminal enters into an area allowing wireless communication with the in-vehicle device, the in-vehicle device detects an approaching portable terminal, and performs a pairing process with respect to the detected portable terminal to establish wireless communication with the portable terminal.

While the power is on, the portable terminal is in a state of automatically activating the short-distance wireless communication function, or it is in a state of keeping the short-distance wireless communication function in standby so that the short-distance wireless communication function can be automatically activated when a connection request is detected. The pairing process is for setting connection for connecting devices by a virtual cable using wireless communication. Specifically, specification and authentication of a communication partner, and common encryption setting used for communication are performed by both the portable device and the in-vehicle device.

Thereafter, when having acquired various types of data provided on the portable terminal from the portable terminal with which wireless communication has been established (see (4) in FIG. 1), the in-vehicle device converts the acquired various types of data into a format outputtable by the in-vehicle device, and outputs the data to at least one of a display (a touch panel) and a speaker (see (5) in FIG. 1).

Specifically, in the portable terminal that has established wireless communication with the in-vehicle device by performing the pairing process, an application is executed by an operation of the user, and an image acquired by the application is displayed on a display or music is output. The in-vehicle device acquires the image and an audio signal provided by the application being executed on the portable terminal from the portable terminal with which wireless communication has been established. The in-vehicle device then converts the acquired image into a format displayable by the own device or converts the acquired image into an image matched with the display to display the converted image on the display, and converts the audio signal into a format outputtable by the own device to output the converted audio signal from the speaker.

Thereafter, the in-vehicle device acquires data regularly (for example, once in a second) from the portable terminal and converts the data into the outputtable format, to output the converted data to at least one of the display and the speaker. Further, the in-vehicle device receives data output every time the displayed image and sound are changed from the portable terminal side, and converts the received data into the outputtable format, to output the converted data to at least one of the display and the speaker.

For example, it is assumed that a navigation application for pedestrian is being executed by a portable terminal. In this case, an in-vehicle device acquires a destination and a guided route to the destination being set and executed by the portable terminal after establishment of wireless communication, and outputs the acquired destination and guided route to at least one of the display and the speaker. Thereafter, the in-vehicle device receives information provided according to the guided route being executed on the portable terminal side, and outputs the information to at least one of the display and the speaker. At this time, the in-vehicle device converts pedestrian navigation data to vehicle navigation data. This is because a display of a traffic lane and transportation guide is different for the pedestrian and the vehicle. Such conversion can be performed on the portable terminal side.

When receiving the operation by a user in navigation information displayed on the display, the in-vehicle device transmits the operation to the portable terminal, receives an operation result from the portable terminal, and outputs the received operation result to at least one of the display and the speaker.

In this way, in the in-vehicle device according to the first embodiment, when the in-vehicle device and the portable terminal are positioned at a distance allowing wireless communication, wireless communication is established automatically without any special operation by the user, and information of the portable terminal can be provided to the in-vehicle device. As a result, linkage between the portable terminal and the in-vehicle device can be easily controlled regardless of user's skills.

Figure 2:
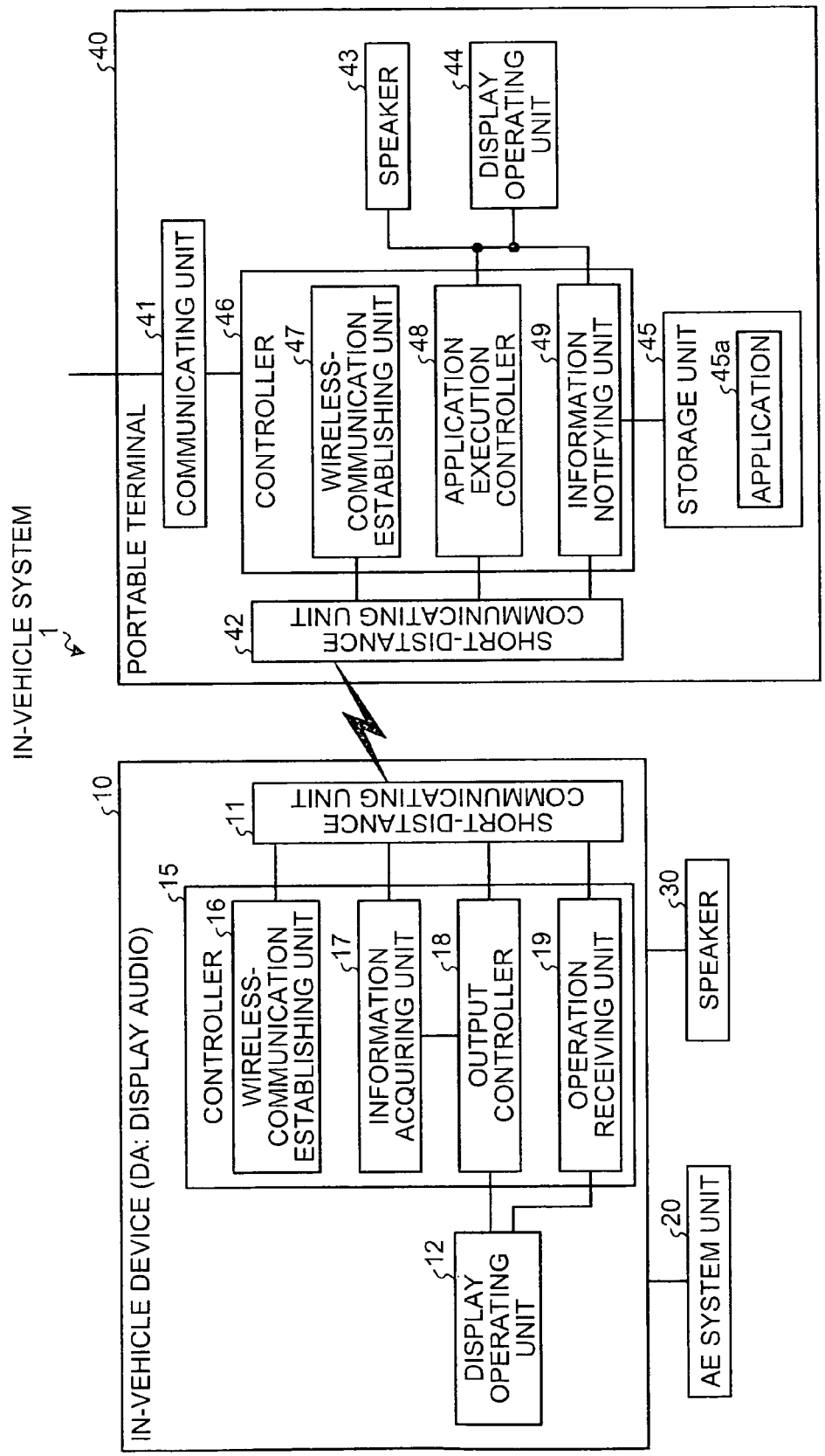
FIG. 2 is a block diagram of a configuration of the in-vehicle system according to the first embodiment.

A configuration of the in-vehicle system shown in FIG. 1 is explained with reference to FIG. 2. FIG. 2 is a block diagram of the configuration of the in-vehicle system. As illustrated in FIG. 2, because an in-vehicle system 1 includes an in-vehicle device 10 and a portable terminal 40, the respective devices are explained.

A configuration of the in-vehicle device 10 in the in-vehicle system 1 is explained first. As illustrated in FIG. 2, the in-vehicle device 10 includes a short-distance communicating unit 11, a display operating unit 12, and a controller 15, and is connected to a vehicle control system (hereinafter, "AE system") unit 20 and a speaker 30.

The AE system unit 20 is connected to the in-vehicle device 10, and includes various sensors that detect a state of the vehicle, such as a vehicle speed sensor, an acceleration sensor, a steering sensor, a brake sensor, and an indicator sensor, to detect speed of the vehicle (car speed), acceleration of the vehicle, positions of tires of the vehicle, an operation of the indicator, and a state of the brake. The speaker 30 outputs an audio signal input from the in-vehicle device 10, and is installed, for example, beside driver's seat, beside passenger's seat, at the left of a rear seat, and at the right of the rear seat.

Returning to the configuration of the in-vehicle device 10, the short-distance communicating unit 11 establishes a communication link with the portable terminal 40 by using short-distance wireless communication such as Bluetooth, and performs communication between the in-vehicle device 10 and the portable terminal 40 by using the established communication link. Bluetooth is a short-distance wireless-communications standard to perform wireless communication in a radius of about dozens of meters by using a frequency band of 2.4 gigahertz. In recent years, Bluetooth is widely applied to electronic devices such as mobile telephones and personal computers.

In the first embodiment, while a case that communication between the in-vehicle device 10 and the portable terminal 40 is performed by using Bluetooth is explained, other wireless communications standard such as Wi-Fi® and ZigBee® can be also used. Alternatively, wired communication can be also performed between the in-vehicle device 10 and the portable terminal 40.

The display operating unit 12 is connected to the controller 15, and displays and outputs an image output from an output controller 18 in the controller 15. Specifically, the display operating unit 12 includes an input/output device such as a touch panel display. The display operating unit 12 displays a received display screen sent from the portable terminal 40 and converted into the format outputtable by the output controller 18, and acquires touch information with respect to the displayed display screen. The touch information includes a coordinate on the touched display and time interval between a touch and a next touch. The display operating unit 12 notifies an operation receiving unit 19 in the controller 15 of the acquired touch information.

The controller 15 includes an internal memory for storing a control program such as an operating system (OS), a program specifying various process procedures, and required data, and also includes a wireless-communication establishing unit 16, an information acquiring unit 17, the output controller 18, and the operation receiving unit 19 to perform various types of processes by these units.

When having detected the portable terminal positioned at a predetermined distance allowing wireless communication with the in-vehicle device 10, the wireless-communication establishing unit 16 establishes wireless communication with the detected portable terminal. Specifically, when the power of the in-vehicle device is turned on, the wireless-communication establishing unit 16 activates the short-distance communicating unit 11, and searches whether there is a terminal in an area allowing wireless communication. When the portable terminal 40 enters an area allowing wireless communication, the wireless-communication establishing unit 16 detects the approaching portable terminal 40, and performs a pairing process using the short-distance communicating unit 11 with respect to the detected portable terminal 40, thereby establishing wireless communication with the portable terminal 40.

The information acquiring unit 17 acquires various types of data provided by the portable terminal 40 from the portable terminal 40, with which wireless communication has been established by the wireless-communication establishing unit 16. Specifically, the information acquiring unit 17 acquires an image and an audio signal provided from the application being executed on the portable terminal 40 from the portable terminal 40 with which wireless communication is established, and outputs acquired information to the output controller 18 described later. The information acquiring unit 17 acquires information (image and sound) from the portable terminal 40 and outputs the acquired information to the output controller 18 at a predetermined opportunity until wireless communication is suspended, with respect to the portable terminal 40 with which wireless communication has been established once by the wireless-communication establishing unit 16.

For example, when the navigation application is being executed by the portable terminal 40, the information acquiring unit 17 acquires a destination and guided route to the destination set and executed by the portable terminal 40 after establishment of wireless communication and outputs the destination and the guided route to the output controller 18. Thereafter, every time the information is updated (a driving route is guided) by the navigation application being executed, the portable terminal 40 transmits the updated information to the in-vehicle device 10, and the information acquiring unit 17 receives and outputs the updated information to the output controller 18. The information acquiring unit 17 can be controlled so that not only the information transmitted from the portable terminal 40 is received but also the information is acquired from the portable terminal 40 at a predetermined opportunity (for example, once in a minute).

The output controller 18 converts various types of data acquired by the information acquiring unit 17 into the outputtable format of the in-vehicle device 10, and outputs the converted data to at least one of the display operating unit 12 and the speaker 30. Specifically, the output controller 18 converts the image acquired by the information acquiring unit 17 into a displayable format by the own device or into an image matched with the display (or a touch panel) of the display operating unit 12 to display the converted image on the display operating unit 12. Further, the output controller 18 converts the audio signal acquired by the information acquiring unit 17 into an outputtable format of the own device and outputs the converted audio signal from the speaker 30.

For example, when the navigation information (image and sound indicating the destination and the guided route to the destination) set by the portable terminal 40 is acquired by the information acquiring unit 17, the output controller 18 converts an acquired navigation image into an image matched with width (W pixels)×height (H pixels) of the display (or a touch panel) of the display operating unit 12 to display the converted image on the display operating unit 12. The output controller 18 converts acquired navigation sound into the outputtable format of the own device and outputs the converted sound from the speaker 30.

Thereafter, when information is acquired by the information acquiring unit 17 every time the driving route is guided on the portable terminal 40 side, the output controller 18 converts the acquired information (navigation image and navigation sound) into an outputtable format of the in-vehicle device 10, and outputs the converted information to at least one of the display operating unit 12 and the speaker 30.

When having received various operations with respect to data displayed on the display operating unit 12, the operation receiving unit 19 transmits the received various operations to the portable terminal 40. Specifically, the operation receiving unit 19 receives touch information from the display operating unit 12, and notifies the portable terminal 40 of the received touch information via the short-distance communicating unit 11. The portable terminal 40 converts the notified touch information into an input operation with respect to the display screen, operates the application based on the input operation, and updates the display screen. An operation result of the operation received by the operation receiving unit 19 is output from the portable terminal 40 and acquired by the information acquiring unit 17, and then converted to the outputtable format of the in-vehicle device 10 by the output controller 18, and output to at least one of the display operating unit 12 and the speaker 30.

A configuration of the portable terminal 40 in the in-vehicle system according to the first embodiment is explained next. As illustrated in FIG. 2, the portable terminal 40 includes a communicating unit 41, a short-distance communicating unit 42, a speaker 43, a display operating unit 44, a storage unit 45, and a controller 46.

The communicating unit 41 communicates with a server device provided on a network such as the Internet and a global positioning system (GPS) communication instrument via a base station of a telecommunication carrier. Specifically by way of examples, when the navigation application is being executed by the portable terminal 40, the communicating unit 41 communicates with the GPS or the like according to an instruction of the navigation application, to acquire a current position of the portable terminal 40.

The short-distance communicating unit 42 establishes a communication link with the in-vehicle device 10 by using the short-distance wireless communication such as Bluetooth as in the short-distance communicating unit 11 of the in-vehicle device 10, and performs communication between the portable terminal 40 and the in-vehicle device 10 by using the established communication link.

Upon reception of the audio signal from an application execution controller 48 or an information notifying unit 49 in the controller 46 described later, the speaker 43 outputs the audio signal to the outside, and outputs sound at the time of normal telephone connection to the outside. The display operating unit 44 includes an input/output device such as a touch panel display, and displays an image output from the application execution controller 48 or the information notifying unit 49 in the controller 46.

The storage unit 45 stores data and programs required for various types of processes performed by the controller 46, and stores, for example, an application 45a to be read and executed by the application execution controller 48. The application 45a is, for example, the navigation application, a music download application, or a video distribution application.

The controller 46 includes an internal memory for storing a control program such as an operating system (OS), a program specifying various process procedures, and required data to perform processes such as audio communication, and also includes a wireless-communication establishing unit 47, the application execution controller 48, and the information notifying unit 49 to perform various types of processes by these units.

The wireless-communication establishing unit 47 establishes wireless communication with the in-vehicle device 10. Specifically, when a pairing process or the like is sent from the in-vehicle device 10 via the short-distance communicating unit 42, the wireless-communication establishing unit 47 transmits a response with respect to the process to the in-vehicle device 10 to establish wireless communication.

The application execution controller 48 receives an instruction operation of a user of the portable terminal 40, and reads an application corresponding to the received operation from the storage unit 45 to execute the application. For example, upon reception of an activation instruction of the navigation application from the user of the portable terminal 40, the application execution controller 48 reads the navigation application from the storage unit 45 to execute the navigation application.

The information notifying unit 49 transmits an image executed by the application execution controller 48 and output to the display operating unit 44, and sound output from the speaker 43 to the in-vehicle device 10 via the short-distance communicating unit 42. For example, when the navigation application is executed by the application execution controller 48, the information notifying unit 49 transmits an image representing a destination and a route to the destination set and executed on the navigation application to the in-vehicle device 10, and transmits guidance sound output along the guided route to the in-vehicle device 10.

When the touch information is notified from the in-vehicle device 10, the information notifying unit 49 converts the touch information into an input operation with respect to the display screen, operates the application based on the input operation, and updates the display screen. The information notifying unit 49 transmits the updated display screen and an audio signal generated associated with the updated display screen to the in-vehicle device 10.

Figure 3:
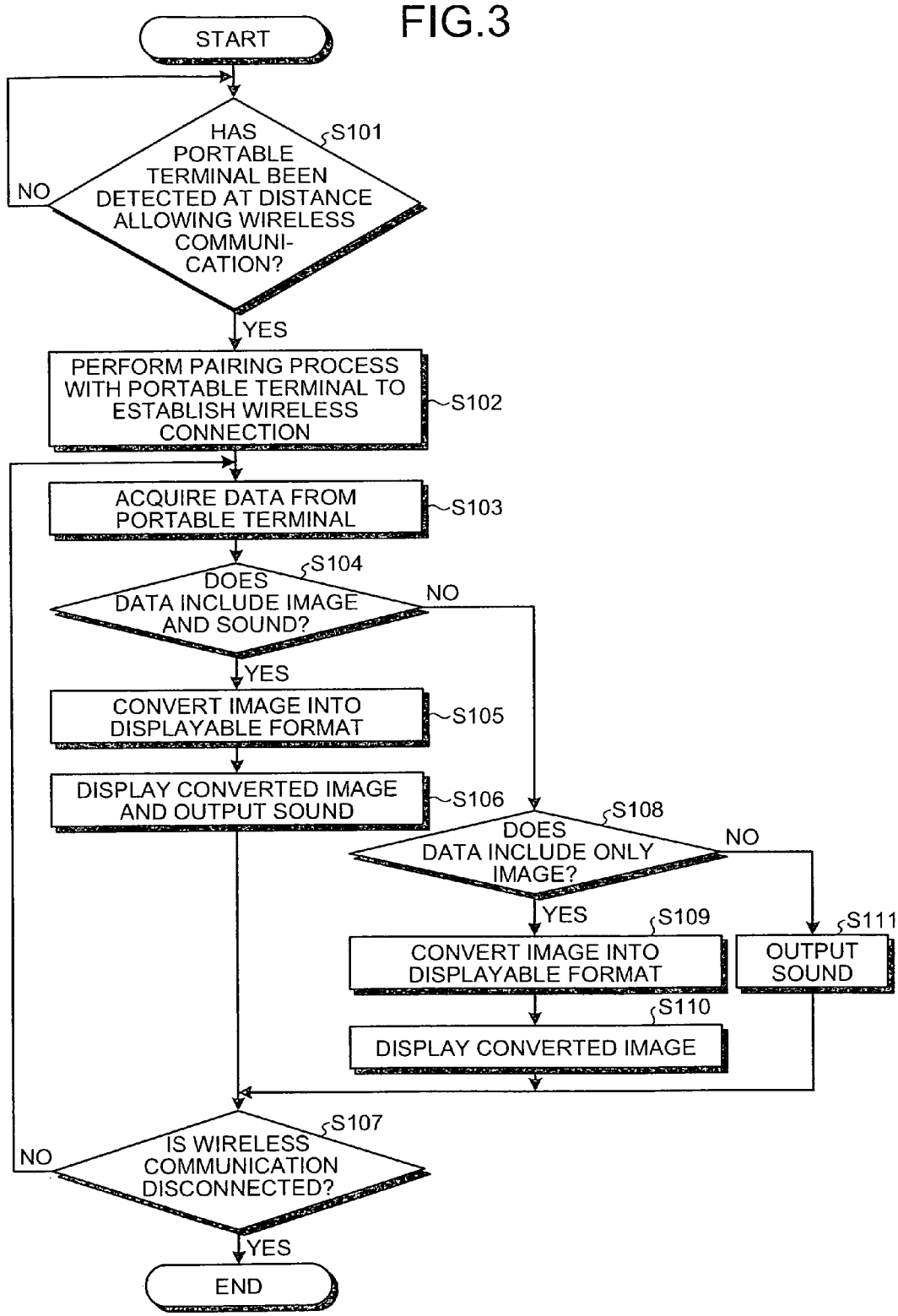
FIG. 3 is a flowchart of a link connection process in the in-vehicle system according to the first embodiment.

Processes performed by the in-vehicle device 10 are explained next with reference to FIG. 3. FIG. 3 is a flowchart of a link connection process in the in-vehicle system 1 according to the first embodiment.

As illustrated in FIG. 3, upon detection of the presence of the portable terminal 40 at a distance allowing wireless communication (YES at Step S101), the in-vehicle device 10 in the in-vehicle system 1 performs the pairing process with the detected portable terminal 40 to establish wireless connection (Step S102). When the portable terminal 40 is executing a navigation for pedestrian, a navigation for vehicle is executed after establishment of wireless communication. Alternatively, pedestrian navigation display is converted into a vehicle navigation display.

Thereafter, the in-vehicle device 10 acquires data from the portable terminal 40 (Step S103), and determines whether the data includes an image and sound based on a format and a type of the acquired data (Step S104). When the acquired data is navigation data, the in-vehicle device 10 converts the navigation data into vehicle data to perform determination.

When the data acquired from the portable terminal 40 includes the image and sound (YES at Step S104), the in-vehicle device 10 converts the image into a displayable format, and converts the sound into an outputtable format (Step S105). The in-vehicle device 10 then displays the converted image on the display operating unit 12 and outputs the sound from the speaker 30 (Step S106).

The in-vehicle device 10 returns to Step S103 so long as wireless communication is continued (NO at Step S107), to repeat the process at Steps S103 to S107, and when wireless communication is disconnected (YES at Step S107), finishes the process. When wireless communication is disconnected, the portable terminal 40 executes a navigation for pedestrian or converts the display into the navigation for pedestrian. The change of navigation and conversion of display to be executed can be performed by the in-vehicle device 10.

Meanwhile, when the acquired data does not include both the image and sound (NO at Step S104), the in-vehicle device 10 determines whether the data includes only the image (Step S108).

Subsequently, when determining that the data acquired from the portable terminal 40 includes only the image (YES at Step S108), the in-vehicle device 10 converts the acquired image into a displayable format (Step S109), and displays the converted image on the display operating unit 12 (Step S110), and then performs the process at Step S107.

On the other hand, when determining that the data acquired from the portable terminal 40 does not include only the image, that is, the data acquired from the portable terminal 40 includes sound (NO at Step S108), the in-vehicle device 10 converts the acquired sound into the outputtable format and outputs the converted sound from the speaker 30 (Step S111), and then performs the process at Step S107.

In this way, according to the first embodiment, when the in-vehicle device 10 and the portable terminal 40 are positioned at a distance allowing wireless communication, wireless communication can be established automatically and the information of the portable terminal 40 can be provided to the linked in-vehicle device 10 without requiring any special operation by a user. As a result, linking and controlling the portable terminal 40 and the in-vehicle device 10 can be easily performed regardless of user's skills.

In the case that the application being executed by the portable terminal 40 is the navigation for pedestrian, when a holder of the portable terminal 40 enters a vehicle, the application changes from an application for pedestrian to an application for vehicle, and is displayed on the in-vehicle device 10. Therefore, smooth shifting from a movement of pedestrian to a movement of vehicle can be realized, while being guided by the navigation.

According to the first embodiment, when a user who is executing the application on the portable terminal 40 enters a vehicle, the user can use the same application continuously in the vehicle, without performing a time-consuming operation such as manually activating the same application in the in-vehicle device 10.

Further, particularly when a driver is in a vehicle, operation of the portable terminal is restricted. However, according to the first embodiment, when the present invention is applied, a content operated on the in-vehicle device 10 is transmitted to the portable terminal 40 to execute the operation on the portable terminal 40 side. That is, by operating the in-vehicle device 10, the portable terminal 40 is operated, thereby solving the problem of inconvenience of a user.

Further, by linking an inexpensive DA that does not have a high-performance function with a high-performance portable terminal, functions same as or higher than those of the high-performance in-vehicle device can be provided. Therefore, it is expected to lead to popularization of DAs, so that services can be provided to users at an inexpensive price and it will lead to gaining many users.

Figure 4:
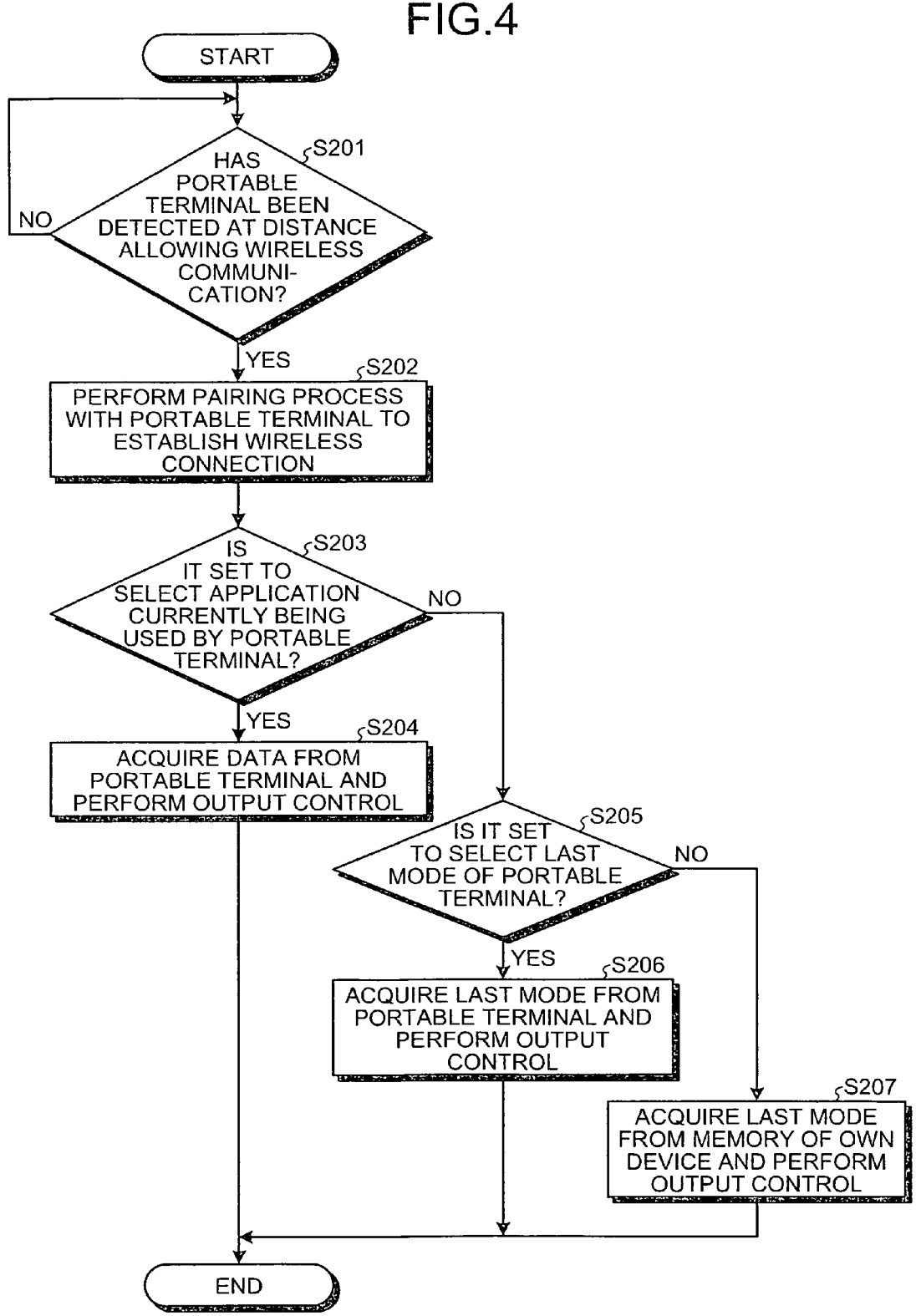
FIG. 4 is a flowchart of a process of an in-vehicle system according to a second embodiment of the present invention.

In the first embodiment, a case that the application being executed on the portable terminal with which wireless communication has been established is executed on the in-vehicle device has been explained. However, the present invention is not limited thereto, and the application to be executed can be changed according to various conditions such as user setting. In this connection, in a second embodiment of the present invention, a case that an application is selected based on various conditions from a portable terminal with which wireless communication has been established and executed by the in-vehicle device is explained with reference to FIG. 4. FIG. 4 is a flowchart for explaining a process of an in-vehicle system according to the second embodiment.

As illustrated in FIG. 4, upon detection of the presence of the portable terminal 40 at a distance allowing wireless communication (YES at Step S201), the in-vehicle device 10 in the in-vehicle system 1 performs the pairing process with the detected portable terminal 40 to establish wireless connection (Step S202).

The in-vehicle device 10 then determines whether to select an application currently being used by the portable terminal 40 based on setting information set beforehand by a user (Step S203).

When it is set to select the application currently being used by the portable terminal 40 (YES at Step S203), the in-vehicle device 10 acquires information of the application currently being used from the portable terminal 40 as in the first embodiment, and outputs the acquired information from the display operating unit 12 and the speaker 30 (Step S204).

On the other hand, when it is not set to select the application currently being used by the portable terminal 40 (NO at Step S203), the in-vehicle device 10 determines whether it is set to select the last mode of the portable terminal 40 (the application recently executed by the portable terminal 40) (Step S205).

When it is set to select the last mode of the portable terminal 40 (YES at Step S205), the in-vehicle device 10 requests execution of the last mode to the portable terminal 40. The portable terminal 40 having received the request acquires information of the executed last mode and the information is output from the display operating unit 12 and the speaker 30 (Step S206).

For example, the in-vehicle device 10 refers to a memory of the portable terminal 40 to make a request of execution of the application recently executed (for example, a music player application) to the portable terminal 40 according to an application execution history in the memory. The portable terminal 40 executes the music player application and transmits the information to the in-vehicle device 10, and the in-vehicle device 10 outputs the information of the music player application acquired from the portable terminal 40 (for example, musical source and operation screen) from the display operating unit 12 and the speaker 30.

For example, it is assumed here that it is commonly set between the in-vehicle device 10 and the portable terminal 40 to link the last mode of the portable terminal 40. In this case, when wireless communication is established with the in-vehicle device 10, the portable terminal 40 can automatically acquire the application recently executed from the application execution history in the memory and execute the application, without receiving an instruction from the in-vehicle device 10.

Returning to Step S205, when it is set not to select the last mode of the portable terminal 40 (NO at Step S205), the in-vehicle device 10 acquires the last mode from the application execution history stored in the memory of the own device and executes the last mode (Step S207). The in-vehicle device 10 notifies the portable terminal 40 of the executed application of the last mode and the portable terminal 40 also executes the received application of the last mode by the own terminal.

Thus, according to the second embodiment, the application linked between the in-vehicle device 10 and the portable terminal 40 can be arbitrarily set by a user. Further, the last mode does not always need be selected, and for example, an application having a large execution history can be automatically selected. In this case, for example, applications and the number of executions can be stored in the memory in association with each other, and at the time of establishment of wireless communication between the in-vehicle device and the portable terminal, a method described in the second embodiment can be used to select and execute an application having a large number of executions by the portable terminal side or the in-vehicle device side to link the portable terminal and the in-vehicle device.

In the first and second embodiments, a case of linking a portable terminal and an in-vehicle device has been explained. However, the present invention is not limited thereto, and when two or more portable terminals that execute a navigation application and an in-vehicle device are to be linked with each other, they can be linked by taking into consideration destinations set by the portable terminals.

Figure 5:
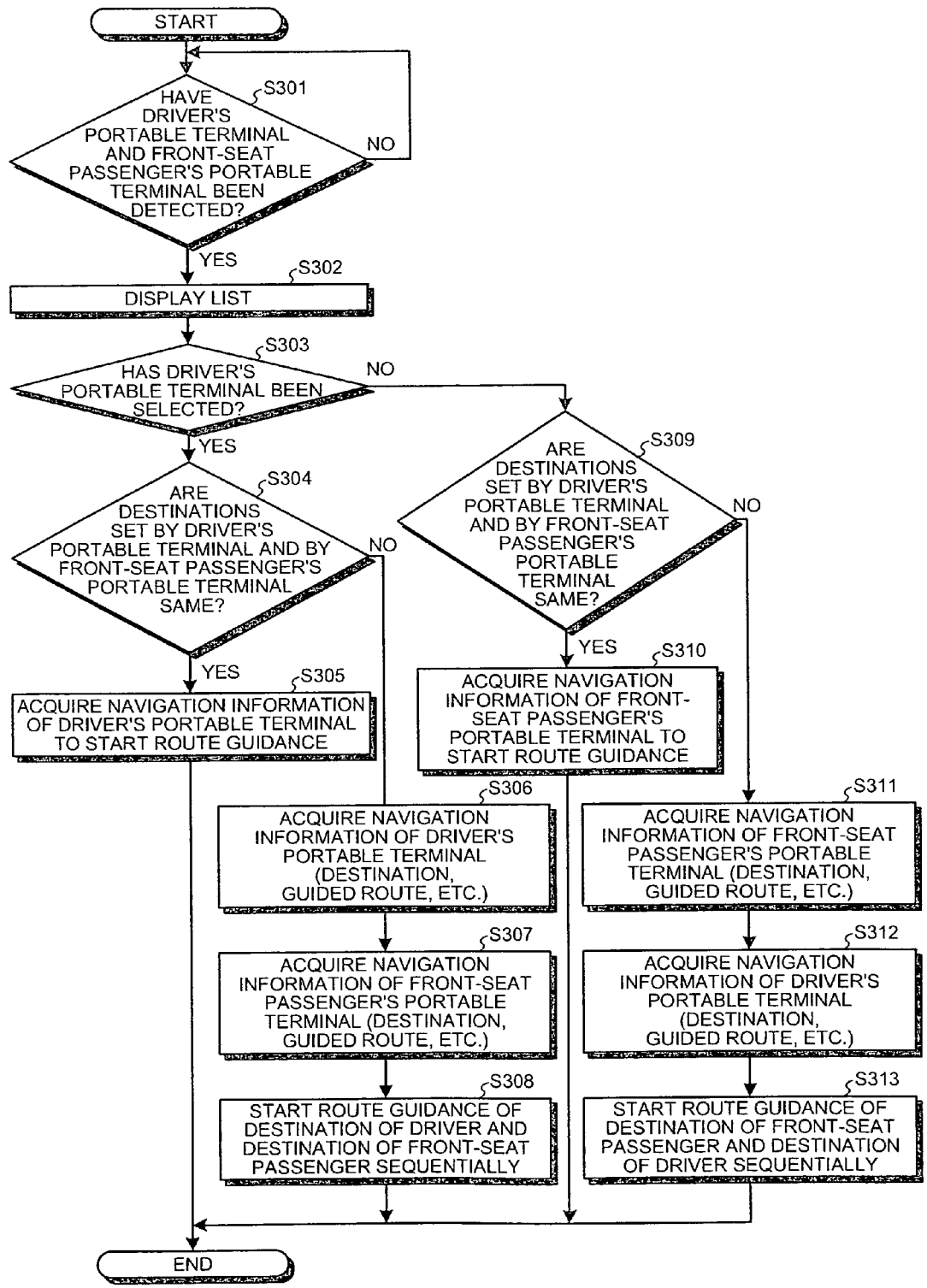
FIG. 5 is a flowchart of a process of an in-vehicle device according to a third embodiment of the present invention.

In this connection, in a third embodiment of the present invention, a case of linking a plurality of portable terminals that execute a navigation application and an in-vehicle device by taking into consideration destinations set by the portable terminals is explained with reference to FIG. 5. FIG. 5 is a flowchart of a process of an in-vehicle system according to the third embodiment.

As illustrated in FIG. 5, the in-vehicle device 10 in the in-vehicle system 1 detects the presence of driver's portable terminal and front-seat passenger's portable terminal that execute the navigation application at a distance allowing wireless communication (YES at Step S301). The in-vehicle device performs a pairing process with detected respective portable terminals to perform wireless communication, detects a plurality of portable terminals, and outputs a list for inquiring with which portable terminal the in-vehicle device is to be linked to the display operating unit 12 or the like (Step S302).

Subsequently, when the driver selects the driver's portable terminal (YES at Step S303), the in-vehicle device determines whether a destination set by the driver's portable terminal coincides with a destination set by the front-seat passenger's portable terminal (Step S304).

When the destination set by the driver's portable terminal coincides with the destination set by the front-seat passenger's portable terminal (YES at Step S304), the in-vehicle device 10 acquires navigation information by establishing wireless communication with the driver's portable terminal to display the navigation information, and outputs route guidance acquired from the driver's portable terminal from the display operating unit 12 and the speaker 30 (Step S305).

On the other hand, when the destination set by the driver's portable terminal does not coincide with the destination set by the front-seat passenger's portable terminal (NO at Step S304), the in-vehicle device 10 acquires the destination from the driver's portable terminal (Step S306). The in-vehicle device 10 then acquires the destination from the front-seat passenger's portable terminal (Step S307). The in-vehicle device 10 acquires navigation information by establishing wireless communication with the driver's portable terminal, notifies the driver's portable terminal of the destination set by the front-seat passenger's portable terminal to execute route search, and then acquires and displays route guidance of the destination of the driver and the destination of the front-seat passenger sequentially (Step S308).

Returning to Step S303, when the driver selects the front-seat passenger's portable terminal (NO at Step S303), the in-vehicle device determines whether the destination set by the driver's portable terminal coincides with the destination set by the front-seat passenger's portable terminal (Step S309).

When the destination set by the driver's portable terminal coincides with the destination set by the front-seat passenger's portable terminal (YES at Step S309), the in-vehicle device 10 acquires navigation information by establishing wireless communication with the front-seat passenger's portable terminal to display the navigation information, and outputs route guidance acquired from the front-seat passenger's portable terminal from the display operating unit 12 and the speaker 30 (Step S310).

On the other hand, when the destination set by the driver's portable terminal does not coincide with the destination set by the front-seat passenger's portable terminal (NO at Step S309), the in-vehicle device 10 acquires the destination from the front-seat passenger's portable terminal (Step S311). The in-vehicle device 10 then acquires the destination from the driver's portable terminal (Step S312). The in-vehicle device 10 acquires navigation information by establishing wireless communication with the front-seat passenger's portable terminal, notifies the front-seat passenger's portable terminal of the destination set by the driver's portable terminal to execute route search, and then acquires and displays route guidance of the destination of the front-seat passenger and the destination of the driver sequentially (Step S313).

In this way, according to the third embodiment, although only one portable terminal is linked with the in-vehicle device 10, route guidance can be displayed by the in-vehicle device 10, taking into consideration both destinations of the driver and the front-seat passenger. As a result, both objects of the driver and the front-seat passenger can be achieved, thereby enabling to improve convenience of users. In the third embodiment, two portable terminals of the driver and the front-seat passenger are explained as an example. However, in a case of three or more portable terminals including portable terminals of rear-seat passengers, the process can be the same as that of using two portable terminals.

Figure 6:
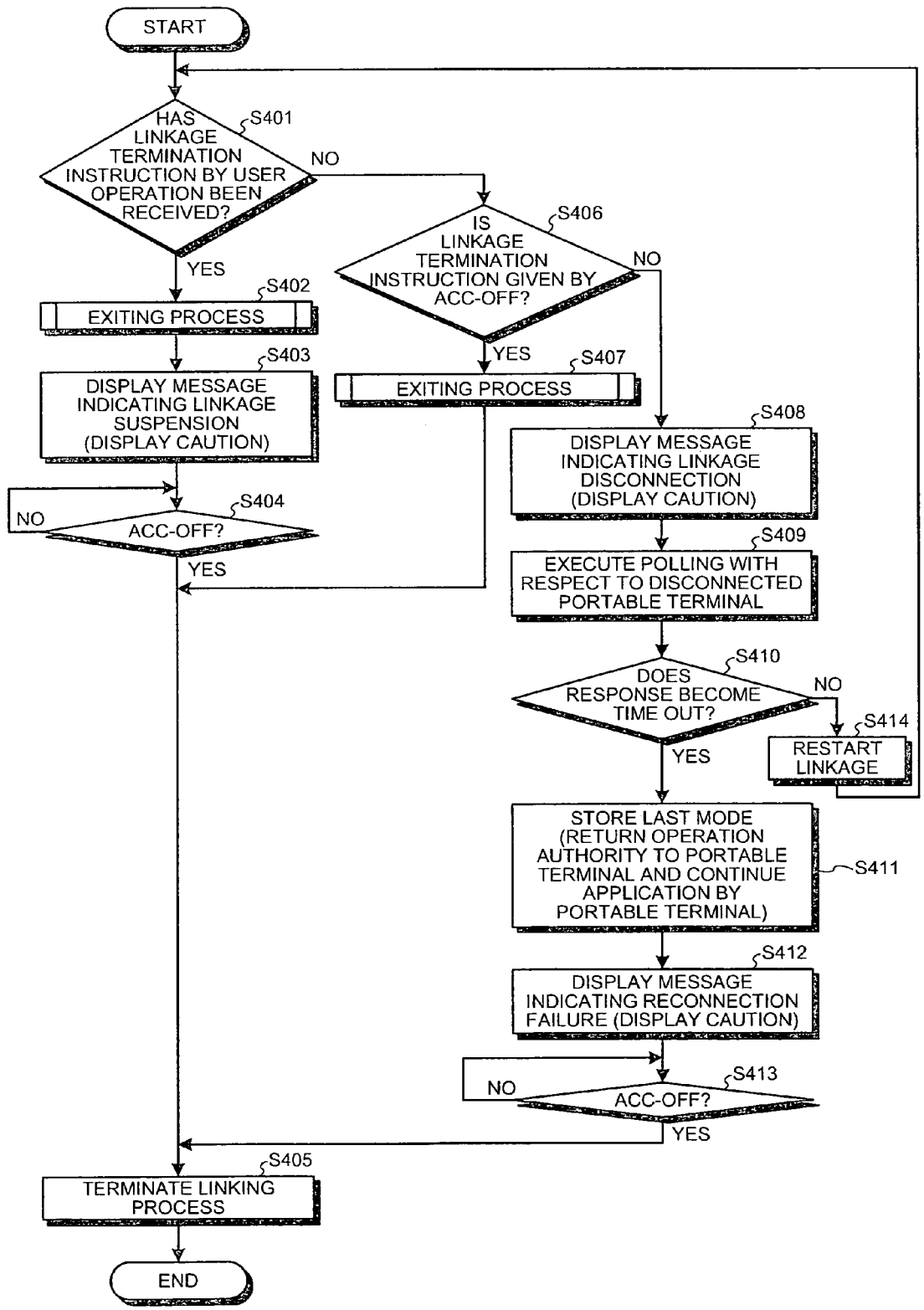
FIG. 6 is a flowchart of a process of an in-vehicle system according to a fourth embodiment of the present invention.

Next, in a fourth embodiment of the present invention, a case of canceling linkage between a portable terminal and an in-vehicle device is explained with reference to FIGS. 6 and 7. FIG. 6 is a flowchart of a process of an in-vehicle system according to the fourth embodiment, and FIG. 7 is a flowchart of an exiting process in the in-vehicle system according to the fourth embodiment.

Figure 7:
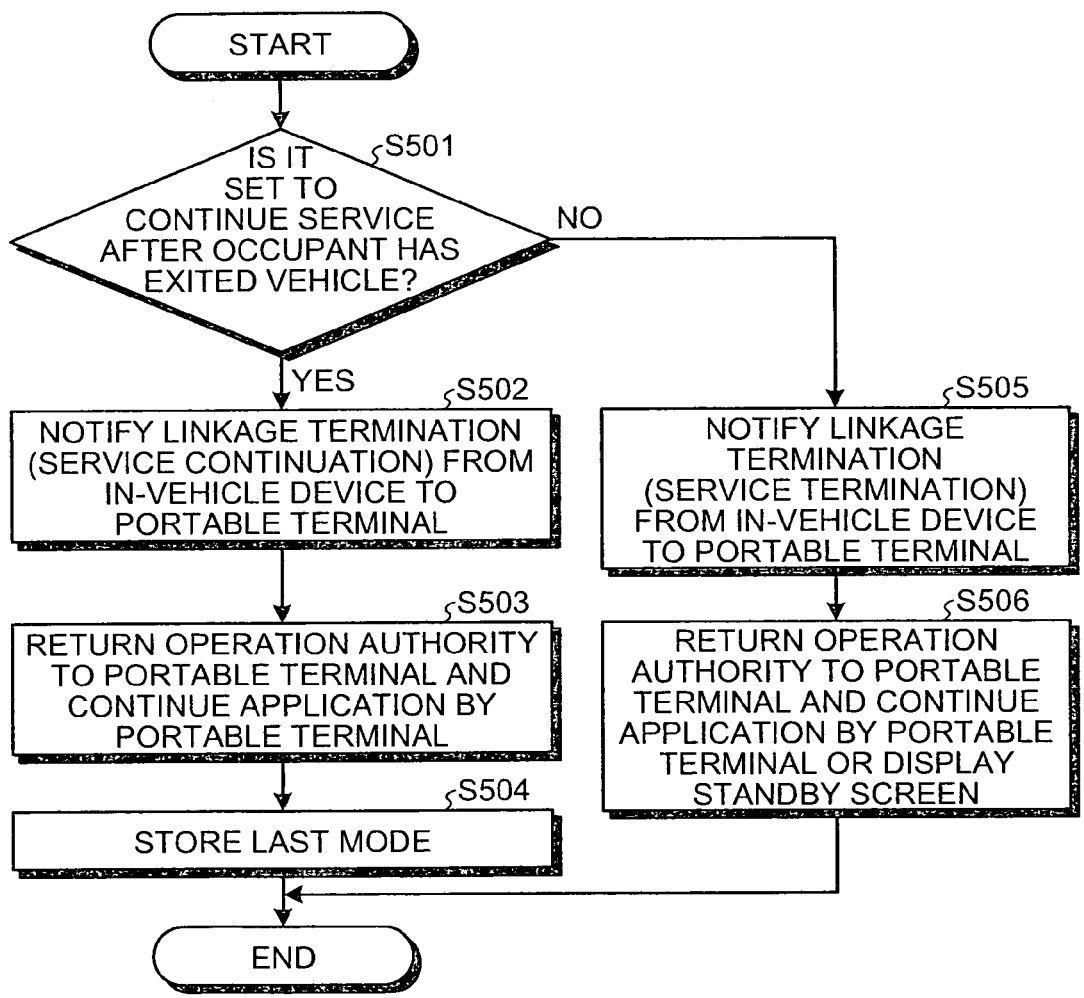
FIG. 7 is a flowchart of an exiting process in the in-vehicle system according to the fourth embodiment.

As illustrated in FIG. 6, upon reception of a linkage termination instruction (for example, pressing of a linkage canceling button) by a user operation (YES at Step S401), the in-vehicle device 10 in the in-vehicle system 1 according to the fourth embodiment performs an exiting process depicted in FIG. 7 (Step S402).

Thereafter, the in-vehicle device 10 outputs a message (a caution) indicating linkage suspension from the display operating unit 12 and the speaker 30 (Step S403), and waits for a vehicle engine (ACC) to be turned off (YES at Step S404), to finish a linking process (Step S405).

On the other hand, returning to Step S401, when the linkage termination instruction by the user operation is not received (NO at Step S401), the in-vehicle device 10 determines whether the linkage termination instruction is given by turning off the vehicle engine (Step S406).

When the linkage termination instruction is given by turning off the vehicle engine (YES at Step S406), the in-vehicle device 10 performs the exiting process in FIG. 7 (Step S407), to finish the linking process (Step S405).

On the other hand, when the linkage termination instruction is not given by turning off the vehicle engine (for example, due to deterioration of signal strength of the portable terminal 40) (NO at Step S406), the in-vehicle device 10 outputs a message indicating that the linkage is disconnected from the display operating unit 12 and the speaker 30 (Step S408), and executes polling with respect to the disconnected portable terminal 40 (Step S409).

When a response of the executed polling becomes time out (YES at Step S410), the in-vehicle device 10 stores the last mode in the memory or the like (Step S411). The in-vehicle device 10 then outputs a message indicating reconnection failure from the display operating unit 12 and the speaker 30 (Step S412), and waits for the vehicle engine to be turned off (YES at Step S413), to finish the linking process (Step S405).

On the other hand, when the response of the executed polling does not become time out and a response cannot be received within predetermined time (NO at Step S410), the in-vehicle device 10 restarts linkage with the portable terminal 40 (Step S414).

The exiting process performed at Steps S402 and S407 in FIG. 6 is explained with reference to FIG. 7.

As illustrated in FIG. 7, when it is set to continue the service in the in-vehicle device 10 (or the portable terminal 40) after the occupant has exited the vehicle (YES at Step S501), the in-vehicle device 10 notifies the portable terminal 40 of linkage termination (Step S502). Accordingly, an operation authority of the linked application is shifted from the in-vehicle device 10 to the portable terminal 40 (Step S503). The in-vehicle device 10 then stores the last mode (Step S504) to finish the exiting process.

On the other hand, when it is not set to continue the service in the in-vehicle device 10 (or the portable terminal 40) after the occupant has exited the vehicle (NO at Step S501), the in-vehicle device 10 notifies the portable terminal 40 of linkage termination to finish the exiting process (Step S505). By this process, the operation authority of the linked application is shifted from the in-vehicle device 10 to the portable terminal 40 and the portable terminal 40 executes the application linked with the in-vehicle device 10 or displays a standby screen (Step S506).

In this way, according to the fourth embodiment, even if an occupant such as a driver exits the vehicle, a content being executed on the in-vehicle device 10 can be executed by the portable terminal 40 continuously. As a result, when the occupant exits the vehicle, time and labor for executing the application again by the portable terminal can be omitted. For example, when the navigation application is used together by the in-vehicle device and the portable terminal, route guidance can be executed continuously by the portable terminal even after the occupant has exited the vehicle.

Further, it can be set not to continue the application after the occupant has exited the vehicle, that is, it can be set whether to continue the application according to an application of a user, thereby enabling to improve the convenience. Further, the route guidance using a public transportation such as bus and train can be processed in the same manner.

While exemplary embodiments of the present invention have been explained above, the present invention can be carried out in various different modes other than the above embodiments. Another embodiment of the present invention is explained below.

For example, when data acquired from a portable terminal is only sound, the in-vehicle device disclosed in the present invention can display an image matched with the sound and a menu screen of the in-vehicle device. That is, even when data linkage without an image, such as data linkage of music, is performed between the in-vehicle device and a portable terminal, an image can be displayed on a display or the like, thereby enabling to eliminate feeling of strangeness of a user caused by no image being displayed on the screen.

When the data acquired from the portable terminal is only an image, the in-vehicle device disclosed in the present invention can output sound matched with the image. That is, even when data linkage without sound, such as data linkage of a map, is performed between the in-vehicle device and the portable terminal, sound can be output from a speaker, thereby enabling to eliminate feeling of strangeness of the user caused by no sound being output from the speaker. Alternatively, these images and sound can be pre-stored, and one to be used is determined beforehand by default.

Among respective processes described in the present embodiment, all or a part of the processes explained as being performed automatically can be performed manually, or all or a part of the processes explained as being performed manually can be performed automatically by a known method. In addition, process procedures, control procedures, specific names, and information including various kinds of data and parameters mentioned in the above embodiment can be arbitrarily changed unless otherwise specified.

The respective constituent elements of the respective devices shown in the drawings are functionally conceptual, and physically the same configuration is not always necessary. That is, the specific mode of distribution and integration of the devices are not limited to the shown ones, and all or a part thereof can be functionally or physically distributed or integrated in an arbitrary unit, according to various kinds of load and the status of use. In addition, all or an arbitrary part of each processing function performed by respective devices can be realized by a central processing unit (CPU) or by a program analyzed and executed in the CPU, or realized as hardware by a wired logic.

The processes performed by the in-vehicle device and the wireless communication system explained in the above embodiments can be realized by executing a prearranged program on a computer such as a personal computer and a workstation. This program can be distributed via a network such as the Internet. Further, this program can be executed by recording it in a computer readable recording medium such as a hard disk, flexible disk (FD), compact-disk read only memory (CD-ROM), magneto-optical disk (MO), and DVD, and reading it from the recording medium by a computer.

In this way, in the in-vehicle device and the wireless communication system according to the present invention, a portable terminal device and an in-vehicle device can be easily linked and controlled regardless of user's skills.

As described above, the in-vehicle device and the wireless communication system according to the present invention are useful to wirelessly communicate with a portable terminal device, and they are suitable to easily control and link a portable terminal device and an in-vehicle device irrespective of user's skills.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-vehicle device that has a display unit and performs wireless communication with a portable terminal device, the in-vehicle device comprising:

a wireless-communication establishing unit that, upon detection of a portable terminal device positioned at a predetermined distance allowing wireless communication with the in-vehicle device, establishes the wireless communication with the detected portable terminal device;

a data acquiring unit that acquires data provided by the portable terminal device, from the portable terminal device with which the wireless communication has been established by the wireless-communication establishing unit; and an output controller that converts data acquired by the data acquiring unit into a format for outputting the data by the in-vehicle device, and outputs converted data to at least one of the display unit and a speaker, wherein the portable terminal device executes a navigation for a pedestrian to search for a route to a destination set by a user, the data acquiring unit acquires pedestrian navigation information provided by the navigation for the pedestrian from the portable terminal device, and the output controller converts the pedestrian navigation information acquired by the data acquiring unit into vehicle navigation information in the format for outputting the information by the in-vehicle device and outputs the vehicle navigation information to at least one of the display unit and the speaker.

2. The in-vehicle device according to claim 1, wherein when an operation indicating a destination change is sent from a user with respect to the vehicle navigation information output to the display unit, the output controller transmits newly input destination information to the portable terminal device to acquire re-searched pedestrian navigation information from the portable terminal device, converts the re-searched pedestrian navigation information into new vehicle navigation information in the format for outputting the information by the in-vehicle device, and outputs the new vehicle navigation information to at least one of the display unit and the speaker.

3. The in-vehicle device according to claim 1, wherein the data acquiring unit selects an application from an application being executed on the portable terminal device, with which wireless communication has been established by the wireless-communication establishing unit, an application recently executed on the portable terminal device, and an application recently executed on the in-vehicle device, and acquires various types of data provided by a selected application.

4. A wireless communication system comprising:
a portable terminal device that provides data and an in-vehicle device that performs wireless communication with the portable terminal device, wherein the in-vehicle device includes:
a display unit;
a wireless-communication establishing unit that, upon detection of a portable terminal device positioned at a predetermined distance allowing wireless communication, establishes the wireless communication with the detected portable terminal device;
a data acquiring unit that acquires vehicle navigation data provided by the portable terminal device, from the portable terminal device with which wireless communication has been established by the wireless-communication establishing unit; and
an output controller that outputs the vehicle navigation data acquired by the data acquiring unit to at least one of the display unit and a speaker, and
the portable terminal device includes an output unit that converts pedestrian navigation data provided by the portable terminal device into the vehicle navigation data in the format for outputting the data by the in-vehicle device, with which wireless communication has been established.

5. An in-vehicle device that has a display unit and performs wireless communication with a portable terminal device, the in-vehicle device comprising:
a wireless-communication establishing unit that, upon detection of a portable terminal device positioned at a predetermined distance allowing wireless communication with the in-vehicle device, establishes the wireless communication with the detected portable terminal device;
a data acquiring unit that acquires vehicle navigation information provided by the portable terminal device, from the portable terminal device with which the wireless communication has been established by the wireless-communication establishing unit; and
an output controller that outputs the vehicle navigation information to at least one of the display unit and a speaker, wherein
the portable terminal device executes a navigation for a pedestrian to search for a route to a destination set by a user, and converts pedestrian navigation information provided by the navigation for pedestrian into the vehicle navigation data in the format for outputting the information by the in-vehicle device.

* * * * *